Oct. 2, 1934.    T. E. MOODIE    1,975,118
ROTATING WING AIRCRAFT
Filed May 17, 1932    2 Sheets-Sheet 1

INVENTOR
Thomas E. Moodie.

Oct. 2, 1934. T. E. MOODIE 1,975,118
ROTATING WING AIRCRAFT
Filed May 17, 1932 2 Sheets-Sheet 2
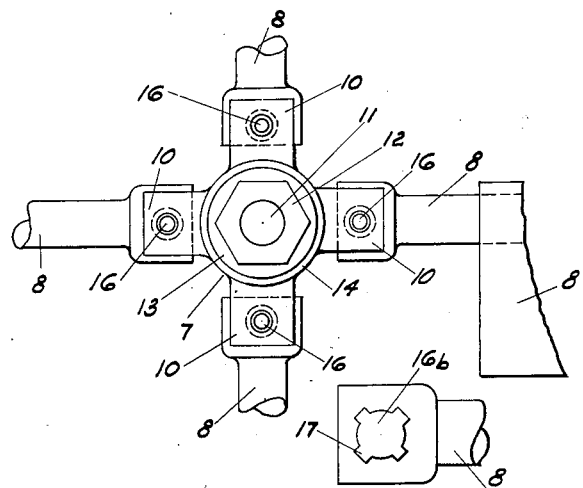
Fig. 7   Fig. 9
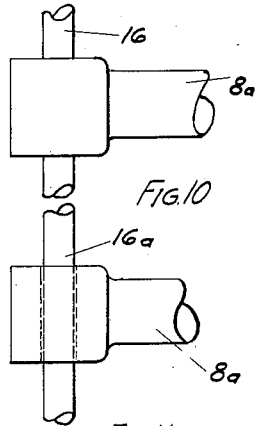
Fig. 10
Fig. 11
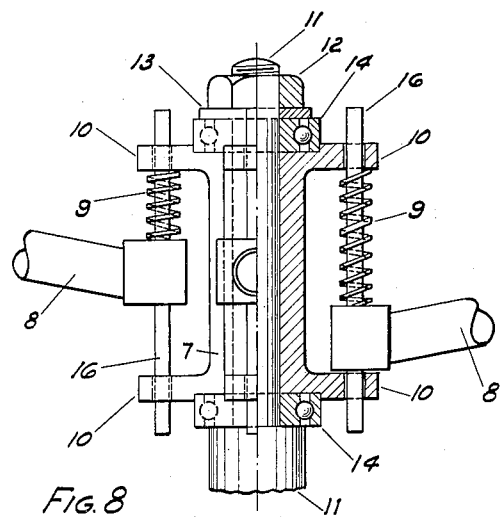
Fig. 8
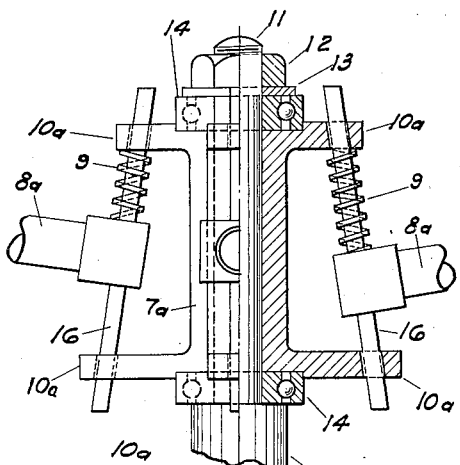
Fig. 12
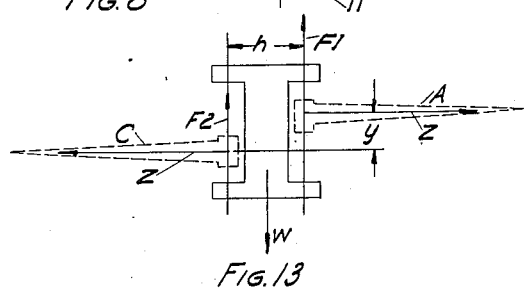
Fig. 13
INVENTOR
Thomas E. Moodie Patented Oct. 2, 1934

1,975,118

UNITED STATES PATENT OFFICE 1,975,118

ROTATING WING AIRCRAFT

Thomas E. Moodie, Atlanta, Ga.

Application May 17, 1932, Serial No. 611,803

20 Claims. (Cl. 244—19)

Generically this invention relates to rotating wing aircraft but it more especially comprehends the type of machine in which the rotating blades or wings are caused to revolve about a central axis of shaft due to the motion of the craft through the air.

Rotating wing aircraft are old in the art and it is a well established fact that as soon as they acquire any forward motion they become laterally unstable due to the differences in the relative velocities of the air flow over the advancing and retreating blades. Various methods have been proposed to overcome this defect among which may be mentioned double rotors revolving in opposite directions and rotor systems in which the axis of rotation is displaced relative to the center of gravity of the machine. Figures 1 and 2 illustrate machines of these known types. Such machines are heavy, inefficient and structurally awkward. Machines have been built in which the blades were made to twist or feather about an axis parallel to their own length so that the angles between the relative wind and the blades on the advancing and retreating sides are different thereby offsetting to a certain extent the asymmetry of lift above referred to. Such machines are subject to the same general defects referred to above and also to difficulties of control and balance particularly in maneuvers.

Therefore it was to overcome the deficiencies of rotating wing aircraft heretofore in use and to provide a structure consisting of an ordinary airplane provided with all the elements necessary for flight and control, such as the motor, propeller, undercarriage, rudder, elevators, etc., in which however, the wings, instead of being fixed rigidly to the body of the machine as in the ordinary airplane, revolve freely around a centrally disposed shaft to which they are attached by means of a rotor-head or hub mounted on suitable bearings, the circular motion of the wings being caused by a component of the air force which is acting on the machine due to its motion through the air. The wings or blades above mentioned being so attached to the rotor-head or hub that they are able to acquire a certain translatory motion in a plane which is approximately perpendicular to a plane which is perpendicular to the axis of rotation. Said translatory motion being upwardly directed when the blade is in the advancing position relative to the direction of flight and downwardly directed when the blade is in the retreating position relative to the direction of flight.

The blade when in the advancing position moving upwardly relative to the plane of rotation, above referred to, against the action of springs or other resilient means, said motion being possible due to the large value of the lift forces on said blade when in this position, the blade when in the retreating position moving downward relative to the above mentioned plane of rotation said downward motion being caused by the above mentioned springs or other resilient means that I designed the rotating wing aircraft forming the subject matter of this invention.

The invention resides in the construction, combination, and arrangement of parts hereinafter more fully described, and claimed, and illustrated in the accompanying drawings in which like characters of reference indicate like parts throughout the several figures of which:

Figures 1 and 2 are illustrations of known forms of rotating wing aircraft previously referred to.

Figures 3, 4, 5, 6, 7, 8, 9, 10, 11, 12 and 13 refer to the present invention.

Figure 7 is a plan view of the rotor-head to a larger scale.

Figure 8 is a partial section in elevation of the preferred form of rotor-head.

Figure 9 is a plan view showing a possible method of preventing the blades from oscillating in the plane in which they are at any instant rotating.

Figure 10 is a detail in elevation showing a straight form of blade attachment.

Figure 11 is a detail in elevation showing a modified form of blade attachment.

Figure 12 is a partial section in elevation of a modified form of rotor-head.

Figure 13 is a diagram showing the distribution of the forces on the rotor-head.

Figure 1:
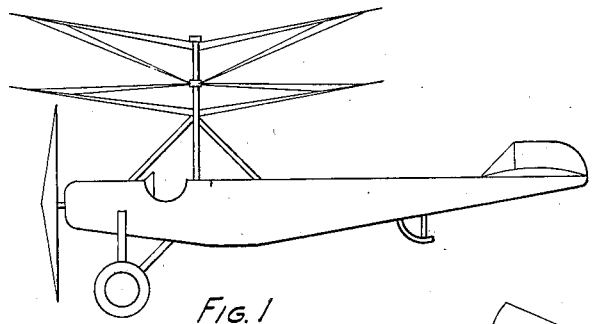
Figure 2:
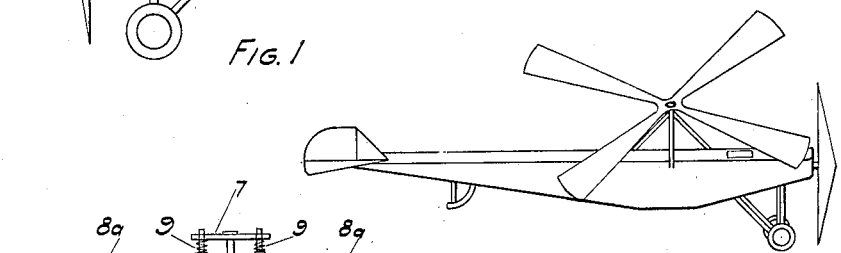
Figure 3:
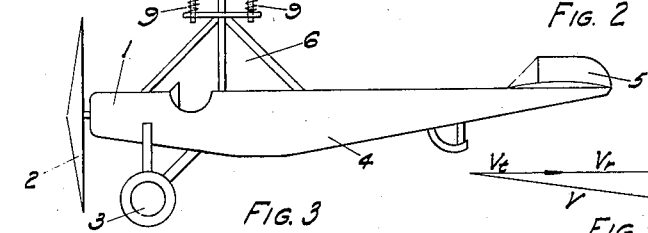
Figure 3 is a side view of one form of the machine which forms the subject matter of the invention.
Figure 4:
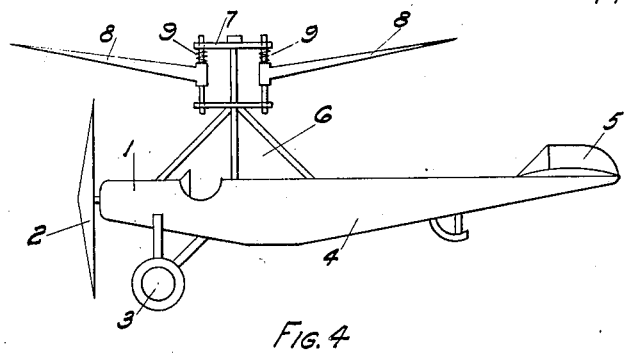
Figure 4 is a side view of the preferred form of construction of the machine which forms the subject matter of the invention.

In the illustrated embodiment characterizing this invention there is shown an aircraft Figures 3 and 4 fitted with the normal elements necessary for flight and control, such as the motor 1, propeller 2, landing gear 3, fuselage 4, and tail surface 5. Mounted on the fuselage 4 is a pyramidal structure 6, and rotatably mounted thereon is a rotor-head 7, to which is movably attached a plurality of vanes 8 (or 8a), said vanes being free to move with respect to said rotor-head 7, subject only to the restraint of resilient means 9, the whole rotor-head structure, as illustrated in Figures 3 and 4, being more fully described in Figures 7, 8, 9, 10, 11 and 12.

Where 10 refers to the extensions or lugs formed on the rotor-head 7, to receive the cross members 16, which are preferably made integral with the inner ends of the wings or blades 8, but which may be made movable with respect thereto (16a—Figure 11). Referring to numerals not previously mentioned, 11 is the shaft or journal forming the apex of the pyramidal structure 6, the rotor-head 7 being rotatably mounted on this shaft and confined thereto by the nut of other fastening means 12, and the washer 13, the whole being journaled on suitable bearing means 14, springs or other means 9 being used to control the movement of the blades 8. Figure 9 is a modified form of blade attachment in which the cross member 16b on the inner end of the blade is splined or otherwise shaped so that the blade is restrained from any rotary motion except that which occurs about the central axis 11, it being fully understood that it is not necessary or essential to so restrain said blades, the machine being capable of successful operation either with the blades so restrained or with the blades free to rotate about the cross member 16, or any similarly located and disposed axis. It being further understood that the splines or keyways 17, or other restraining means may be formed on the cross members 16b, to act in conjunction with similar means on the rotor-head lugs 10 or 10a, or that the companion means may be formed on the inner ends of blades 8 in case the form of construction shown in Figure 11 is used and it is desired not to allow rotation about the axis 16a.

It will thus be seen that the wings or blades, including their cross members 16, and the hub 7, are free to rotate about a central axis or shaft 11, and that said wing structures are also freely and individually movable in a plane approximately perpendicular to a plane which is perpendicular to the axis of rotation subject only to the restraint of springs or other resilient means 9, said blades 8 may be allowed a rotational movement about an axis 16, or about any axis similarly located or they may be restrained from such movement.

In varying types of aircraft and corresponding operating requirements it may be found expedient to slightly vary the arrangement of the connections between the rotor-head, or hub, and the movable blades attached thereto without, however, departing from the principle of the invention above described, and one such modified form is illustrated in Figure 12 wherein hub 7a is similar to hub 7, except that the extensions or lugs 10a are shorter at the top than at the bottom. The blades 8 on this form of construction being constrained to move inward slightly as they move up. The reverse type of construction (not shown) could also be used, the blades moving outward slightly as they move up.

A straight form of blade end may be found expedient in some cases, this form is illustrated to a large scale in Figures 10 and 12 and consists essentially of a blade 8a which has not been bent upward as in the preferred form, it being understood that this form of construction could be used with suitable modification in conjunction with the preferred form of construction, as illustrated in Figures 7 and 8, or in the modified form of construction as illustrated in Figure 12. This form of blade end could of course be further modified as illustrated in Figure 9 and/or Figure 11. In Figure 3 this form of blade is shown in place on the complete machine.

Figure 5:
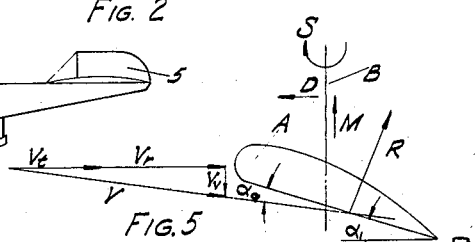
Figures 5 and 6 are diagrams explaining the action of the device.
Figure 6:
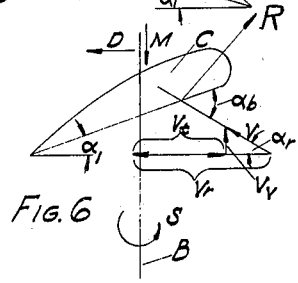

While the operation of the device would seem to be clear from the above description, a better understanding of the principles involved may be obtained by reference to Figures 5 and 6. Figure 5 referring to the advancing blade, and Figure 6 referring to the retreating blade. In Figure 5 the airfoil A makes a small fixed angle $a_1$ with the axis of rotation B. As the blade rotates in the direction indicated by the arrow S and moves forward with the machine in the direction indicated by the arrow D, it encounters a relative airflow $V_t$ due to the translatory motion D and a relative airflow $V_r$ due to the rotational motion S. This airflow ($V_t$ plus $V_r$) being of large magnitude brings into existence the airforce R upwardly inclined which gives the blade an additional motion M in a direction parallel to the axis of rotation. This motion causing a further relative airflow $V_v$ and also causing a compression of the springs 9 previously referred to. The resultant airflow acting on the blade A when in the advancing position being shown as V which is directed so as to strike the airfoil A at a small angle of attack which is smaller than the original fixed angle of incidence. It is therefore seen that the magnitude of the motion M determines the effective angle of attack $aa$ on the advancing blade and by decreasing this angle offsets to some extent the large lift on this blade due to its large effective air speed.

Referring to Figure 6, it is seen that the airflow in the horizontal plane is the difference between $V_r$ and $V_t$ and is therefore small, the resultant airforce being likewise small the airfoil C is caused to descend by the action of the springs 9 previously compressed and the airflow $V_v$ resulting from this motion causes the final resultant airflow to strike the blade at a large effective angle of attack $ar$, the lower airspeed on the blade being to some extent compensated for by the higher effective angle of attack $ar$, and the resulting higher lift coefficient. It will be noted that the resultant airforce R which acts on the retreating blade leans well ahead of the vertical axis B and has a large horizontal component which causes the whole system to rotate in the direction indicated by the arrow S and at the velocity indicated by the symbol $V_r$. All forces, velocities, angles, etc., eventually reaching a stable condition the character of which will depend on the constructional features of the individual machine and upon the speed of advance.

Referring now to Figure 13, which is a diagram of the forces acting on the rotor-head, it is seen that the advancing blade A is in the upward position and the retreating blade C is in the downward position. Such location of the blades indicating a large force $F_1$, acting on the rotor-head on the advancing side and a small force $F_2$, acting on the retreating side. The total weight of the machine W being supported by the two forces $F_1$ plus $F_2$ and the upsetting moment ($F_1$—$F_2$)

$$\frac{xh}{2}$$

caused by the difference in lift forces being overcome by the centrifugal couple Z X Y brought into play by the centrifugal forces and the vertical displacement of the blades.

From the above it will be apparent that I have designed a novel form of rotating wing aircraft consisting of an airplane fitted with all the elements necessary for flight and control, such as the motor propeller, landing gear, fuselage, tail surfaces, etc., in which however, the wings instead of being fixed as on a normal airplane, consist of a plurality of blades, or vanes, means for connecting these blades to a rotor-head movably with respect thereto, and, means for mounting said rotor-head and blades on the aforementioned aircraft rotatably with respect thereto, said machine comprising few parts, simple in construction, manufacturable at a reasonable cost, and efficient for the purposes intended.

Although in practice I have found that the form of my invention illustrated in the accompanying drawings and referred to in the above description as the preferred embodiment is the most efficient and practicable, yet realizing the conditions concurrent with the adoption of my invention will necessarily vary, I desire to emphasize that various minor changes in details of construction, proportion, and arrangement of parts may be resorted to within the scope of the appended claims without departing from, or sacrificing any of the principles of the invention.

Having thus described my invention what I desire protected by Letters Patent are as set forth in the following claims.

1. In aircraft a supporting structure secured to the body of the aircraft and surmounted by an axis or shaft, a hub or rotor-head rotatably mounted on said axis guide members mounted on said rotor-head, a plurality of symmetrically disposed wings the inner ends of which are pivotally mounted on said guide members and longitudinally slidable relative thereto, said wings being upwardly inclined with respect to a plane which is perpendicular to the aforementioned axis of rotation, resilient means associated with said wings and said rotor-head, whereby the wings and rotor-head associated therewith may rotate as a unit about the aforementioned axis the wings at the same time having a reciprocating motion said motion being inclined with respect to said axis and occurring in approximately the same plane as that containing said axis, the motion of the wings above referred to being caused by the varying nature of the resultant force acting thereon, the wings at all times being free to rotate about individual axes, said axes lying in approximately the same plane as the main axis of rotation, and inclined with respect thereto.

2. In aircraft a supporting structure secured to the body of the aircraft and surmounted by an axis or shaft, a hub or rotor-head rotatably mounted on said axis guide members mounted on said rotor-head, a plurality of symmetrically disposed wings the inner ends of which are pivotally mounted on said guide members and longitudinally slidable relative thereto, said wings being upwardly inclined with respect to a plane which is perpendicular to the aforementioned axis of rotation, resilient means associated with said wings and said rotor-head, whereby the wings and rotor-head associated therewith may rotate as a unit about the aforementioned axis the wings at the same time having a reciprocating motion said motion being inclined with respect to said axis and occurring in approximately the same plane as that containing said axis, the motions of the wings above referred to being caused by the varying nature of the resultant force acting thereon.

3. In aircraft a supporting structure secured to the body of the aircraft and surmounted by an axis or shaft, a hub or rotor-head rotatably mounted on said axis guide members mounted on said rotor-head, a plurality of symmetrically disposed wings the inner ends of which are pivotally mounted on said guide members and longitudinally slidable relative thereto, said wings being upwardly inclined with respect to a plane which is perpendicular to the aforementioned axis of rotation, whereby the wings and rotor-head associated therewith may rotate as a unit about the aforementioned axis the wings at the same time having a reciprocating motion said motion being inclined with respect to said axis and occurring in approximately the same plane as that containing said axis, the motions of the wings above referred to being caused by the varying nature of the resultant force acting thereon, the wings at all times being free to rotate about individual axes, said axes lying in approximately the same plane as the main axis of rotation, and inclined with respect thereto.

4. In aircraft a supporting structure secured to the body of the aircraft and surmounted by an axis or shaft, a hub or rotor-head rotatably mounted on said axis guide members mounted on said rotor-head, a plurality of symmetrically disposed wings the inner ends of which are pivotally mounted on said guide members and longitudinally slidable relative thereto, said wings being upwardly inclined with respect to a plane which is perpendicular to the aforementioned axis of rotation, whereby the wings and rotor-head associated therewith may rotate as a unit about the aforementioned axis the wings at the same time having a reciprocating motion said motion being inclined with respect to said axis and occurring in approximately the same plane as that containing said axis, the motions of the wings above referred to being caused by the varying nature of the resultant forces acting thereon.

5. In aircraft a supporting structure secured to the body of the aircraft and surmounted by an axis or shaft, a hub or rotor-head rotatably mounted on said axis guide members mounted on said rotor-head, a plurality of symmetrically disposed wings the inner ends of which are pivotally mounted on said guide members and longitudinally slidable relative thereto, resilient means associated with said wings and said rotor-head, whereby the wings and rotor-head associated therewith may rotate as a unit about the aforementioned axis the wings at the same time having a reciprocating motion said motion being inclined with respect to said axis and occurring in approximately the same place as that containing said axis, the motions of the wings above referred to being caused by the varying nature of the resultant force acting thereon, the wings at all times being free to rotate about individual axes, said axes lying in approximately the same plane as the main axis of rotation, and inclined with respect thereto.

6. In aircraft a supporting structure secured to the body of the aircraft and surmounted by an axis or shaft, a hub or rotor-head rotatably mounted on said axis guide members mounted on said rotor-head, a plurality of symmetrically disposed wings the inner ends of which are pivotally mounted on said guide members and longitudinally slidable relative thereto, resilient means associated with said wings and said rotor-head, whereby the wings and rotor-head associated therewith may rotate as a unit about the aforementioned axis the wings at the same time having a reciprocating motion said motion being inclined with respect to said axis and occurring in approximately the same plane as that containing said axis, the motions of the wings above referred to being caused by the varying nature of the resultant force acting thereon.

7. In aircraft a supporting structure secured to the body of the aircraft and surmounted by an axis or shaft, a hub or rotor-head rotatably mounted on said axis guide members mounted on said rotor-head, a plurality of symmetrically disposed wings the inner ends of which are pivotally mounted on said guide members and longitudinally slidable relative thereto, whereby the wings and rotor-head associated therewith may rotate as a unit about the aforementioned axis the wings at the same time having a reciprocating motion said motion being inclined with respect to said axis and occurring in approximately the same plane as that containing said axis, the motions of the wings above referred to being caused by the varying nature of the resultant force acting thereon, the wings at all times being free to rotate about individual axes, said axes lying in approximately the same plane as the main axis of rotation, and inclined with respect thereto.

8. In aircraft a supporting structure secured to the body of the aircraft and surmounted by an axis or shaft, a hub or rotor-head rotatably mounted on said axis guide members mounted on said rotor-head, a plurality of symmetrically disposed wings the inner ends of which are pivotally mounted on said guide members and longitudinally slidable relative thereto, whereby the wings and rotor-head associated therewith may rotate as a unit about the aforementioned axis the wings at the same time having a reciprocating motion said motion being inclined with respect to said axis and occurring in approximately the same plane as that containing said axis, the motions of the wings above referred to being caused by the varying nature of the resultant force acting thereon.

9. In aircraft a supporting structure secured to the body of the aircraft and surmounted by an axis or shaft, a hub or rotor-head rotatably mounted on said axis guide members mounted on said rotor-head, a plurality of symmetrically disposed wings the inner ends of which are pivotally mounted on said guide members and longitudinally slidable relative thereto, said wings being upwardly inclined with respect to a plane which is perpendicular to the aforementioned axis of rotation, resilient means associated with said wings and said rotor-head, whereby the wings and rotor-head associated therewith may rotate as a unit about the aforementioned axis, the wings at the same time having a reciprocating motion, said motion occurring in approximately the same plane as that containing said axis, the motions of the wings referred to being caused by the varying nature of the resultant force acting thereon, the wings at all times being free to rotate about individual axes, said axes lying in approximately the same plane as the main axis of rotation.

10. In aircraft a supporting structure secured to the body of the aircraft and surmounted by an axis or shaft, a hub or rotor-head rotatably mounted on said axis guide members mounted on said rotor-head, a plurality of symmetrically disposed wings the inner ends of which are pivotally mounted on said guide members and longitudinally slidable relative thereto, said wings being upwardly inclined with respect to a plane which is perpendicular to the aforementioned axis of rotation, resilient means associated with said wings and said rotor-head, whereby the wings and rotor-head associated therewith may rotate as a unit about the aforementioned axis, the wings at the same time having a reciprocating motion, said motion occurring in approximately the same plane as that containing said axis, the motion of the wings above referred to being caused by the varying nature of the resultant force acting thereon.

11. In aircraft a supporting structure secured to the body of the aircraft and surmounted by an axis or shaft, a hub or rotor-head rotatably mounted on said axis guide members mounted on said rotor-head, a plurality of symmetrically disposed wings the inner ends of which are pivotally mounted on said guide members and longitudinally slidable relative thereto, said wings being upwardly inclined with respect to a plane which is perpendicular to the aforementioned axis of rotation, whereby the wings and rotor-head associated therewith may rotate as a unit about the aforementioned axis, the wings at the same time having a reciprocating motion, said motion occurring in approximately the same plane as that containing said axis, the motions of the wings above referred to being caused by the varying nature of the resultant force acting thereon, the wings at all times being free to rotate about individual axes, said axes lying in approximately the same plane as the main axis of rotation.

12. In aircraft a supporting structure secured to the body of the aircraft and surmounted by an axis or shaft, a hub or rotor-head rotatably mounted on said axis guide members mounted on said rotor-head, a plurality of symmetrically disposed wings the inner ends of which are pivotally mounted on said guide members and longitudinally slidable relative thereto, said wings being upwardly inclined with respect to a plane which is perpendicular to the aforementioned axis of rotation, whereby the wings and rotor-head associated therewith may rotate as a unit about the aforementioned axis, the wings at the same time having a reciprocating motion, said motion occurring in approximately the same plane as that containing said axis, the motions of the wings above referred to being caused by the varying nature of the resultant force acting thereon.

13. In aircraft a supporting structure secured to the body of the aircraft and surmounted by an axis or shaft, a hub or rotor-head rotatably mounted on said axis guide members mounted on said rotor-head, a plurality of symmetrically disposed wings the inner ends of which are pivotally mounted on said guide members and longitudinally slidable relative thereto, resilient means associated with said wings and said rotor-head, whereby the wings and rotor-head associated therewith may rotate as a unit about the aforementioned axis, the wings at the same time having a reciprocating motion, said motion occurring in approximately the same plane as that containing said axis, the motions of the wings above referred to being caused by the varying nature of the resultant force acting thereon, the wings at all times being free to rotate about individual axes, said axes lying in approximately the same plane as the main axis of rotation.

14. In aircraft a supporting structure secured to the body of the aircraft and surmounted by an axis or shaft, a hub or rotor-head rotatably mounted on said axis guide members mounted on said rotor-head, a plurality of symmetrically disposed wings the inner ends of which are pivotally mounted on said guide members and longitudinally slidable relative thereto, resilient means associated with said wings and said rotor-head, whereby the wings and rotor-head associated therewith may rotate as a unit about the aforementioned axis, the wings at the same time having a reciprocating motion, said motion occurring in approximately the same plane as that containing said axis, the motions of the wings above referred to being caused by the varying nature of the resultant force acting thereon.

15. In aircraft a supporting structure secured to the body of the aircraft and surmounted by an axis or shaft, a hub or rotor-head rotatably mounted on said axis guide members mounted on said rotor-head, a plurality of symmetrically disposed wings the inner ends of which are pivotally mounted on said guide members and longitudinally slidable relative thereto, whereby the wings and rotor-head associated therewith may rotate as a unit about the aforementioned axis, the wings at the same time having a reciprocating motion, said motion occurring in approximately the same plane as that containing said axis, the motions of the wings referred to being caused by the varying nature of the resultant force acting thereon, the wings at all times being free to rotate about individual axes, said axes lying in approximately the same plane as the main axis of rotation.

16. In aircraft a supporting structure secured to the body of the aircraft and surmounted by an axis or shaft, a hub or rotor-head rotatably mounted on said axis guide members mounted on said rotor-head, a plurality of symmetrically disposed wings the inner ends of which are pivotally mounted on said guide members and longitudinally slidable relative thereto, whereby the wings and rotor-head associated therewith may rotate as a unit about the aforementioned axis, the wings at the same time having a reciprocating motion, said motion occurring in approximately the same plane as that containing said axis, the motions of the wings above referred to being caused by the varying nature of the resultant force acting thereon.

17. In aircraft a supporting structure secured to the body of the aircraft and surmounted by an axis or shaft, a hub or rotor-head rotatably mounted on said axis guide members mounted on said rotor-head, a plurality of symmetrically disposed wings the inner ends of which are pivotally mounted on said guide members and longitudinally slidable relative thereto, said wings being upwardly inclined with respect to a plane which is perpendicular to the aforementioned axis of rotation.

18. In aircraft a supporting structure secured to the body of the aircraft and surmounted by an axis or shaft, a hub or rotor-head rotatably mounted on said axis guide members mounted on said rotor-head, a plurality of symmetrically disposed wings the inner ends of which are pivotally mounted on said guide members and longitudinally slidable relative thereto.

19. In aircraft a supporting structure secured to the body of the aircraft and surmounted by an axis or shaft, a hub or rotor-head rotatably mounted on said axis guide members mounted on said rotor-head, a plurality of symmetrically disposed wings the inner ends of which are pivotally mounted on said guide members and longitudinally slidable relative thereto, said wings being upwardly inclined with respect to a plane which is perpendicular to the aforementioned axis of rotation.

20. In aircraft a supporting structure secured to the body of the aircraft and surmounted by an axis or shaft, a hub or rotor-head rotatably mounted on said axis guide members mounted on said rotor-head, a plurality of symmetrically disposed wings the inner ends of which are pivotally mounted on said guide members and longitudinally slidable relative thereto.

THOMAS E. MOODIE.